United States Patent [19]
Beller

[11] 3,790,099

[45] Feb. 5, 1974

[54] ENERGY ABSORBING RETRACTOR

[75] Inventor: Herbert R. Beller, Mt. Clemens, Mich.

[73] Assignee: Allied Chemical Corporation, New York, N.Y.

[22] Filed: May 10, 1972

[21] Appl. No.: 252,057

[52] U.S. Cl.............................. 242/107.4, 297/386
[51] Int. Cl...................... A62b 35/00, B65h 63/00
[58] Field of Search 242/107 R, 107.2, 107.3, 107.7, 242/107.5 B; 280/150.5 B; 297/386, 387, 388

[56] References Cited
UNITED STATES PATENTS

| | | | |
|---|---|---|---|
| 3,442,466 | 5/1969 | Fritsche | 242/107.4 |
| 3,666,198 | 5/1972 | Neumann | 242/107.4 |
| R11,067 | 3/1890 | Griswold | 242/107.3 |

Primary Examiner—John W. Huckert
Assistant Examiner—Jon W. Henry
Attorney, Agent, or Firm—Jonathan Plaut; Roger H. Criss

[57] ABSTRACT

An energy absorbing seat belt retractor of the automatic locking or inertia locking type which includes an energy absorbing system that allows a belt shaft to rotate with respect to a locking wheel at a predetermined applied load so that belting is paid out. After a predetermined amount of rotation of the belt shaft, an increased load is required to further pay out the belting. Kinetic energy of an occupant moving forward from his seated position into contact with the belting is absorbed during the initial rotation of the shaft at the predetermined load and during any further rotation at a higher level.

10 Claims, 3 Drawing Figures

PATENTED FEB 5 1974 3,790,099

3,790,099

ENERGY ABSORBING RETRACTOR

BACKGROUND OF THE INVENTION

This invention relates to an energy absorbing system for safety seat belt retractors of the automatic locking and of the inertia locking type.

SUMMARY OF THE INVENTION

In accordance with this invention, there is provided an energy absorbing seat belt retractor comprising a locking wheel having an internal aperture, the walls of which are beveled, means to lock the locking wheel, an outer shaft communicating with the locking wheel and having one end beveled towards the beveled walls of the aperture and being pressed thereagainst, spring means urging the ratchet wheel and shaft into abutting relationship, a load shaft inserted in the aperture and extending internally through the outer shaft, retaining means in the opposite end of the outer shaft, loading means rotatable with the outer shaft and supported by the load shaft and spaced from the opposite end of the outer shaft, the loading means including means communicating with the retaining means, the outer shaft being rotatable with respect to the locking wheel when the locking wheel is locked, and the loading means being movable in an axial direction towards the opposite end of the outer shaft and into abutting relation therewith upon rotation of the outer shaft when the locking wheel is locked. The outer or belt shaft of the retractor is allowed to rotate with respect to the wheel at a predetermined applied load and rotation of the shaft causes the belting wound thereon to pay out. After a predetermined amount of rotation of the shaft, an increased load is required to further pay out the belting. Kinetic energy of an occupant moving forward from his seated position into contact with the belting is absorbed during the initial rotation of the shaft at the predetermined load and during any further rotation at a higher load. In this manner, the occupant can come to a stop at the end of his forward travel without being rebounded towards his initial position and thereby possibly being injured.

This invention further provides means to predetermine the initial load at which the belt shaft rotates with respect to the ratchet wheel and adjust the amount of belt shaft rotation at a constant predetermined load before allowing the belt shaft to additionally rotate at an increased load.

DESCRIPTION OF THE PREFERRED EMBODIMENT

Figure 1:
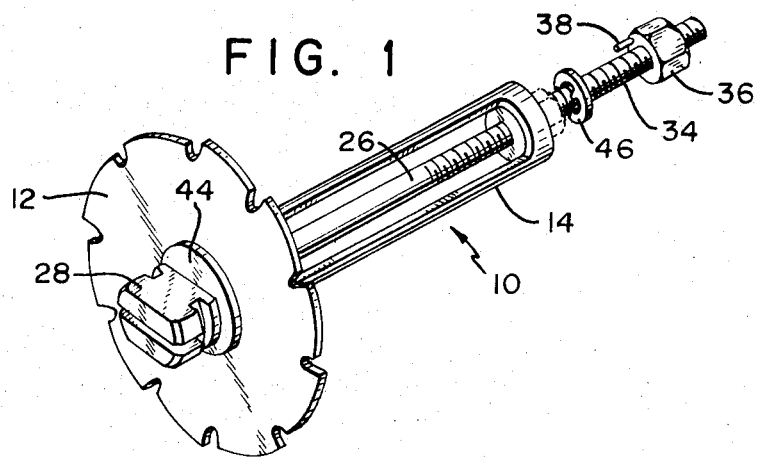
FIG. 1 is a perspective view of the energy absorbing system of this invention.
Figure 2:
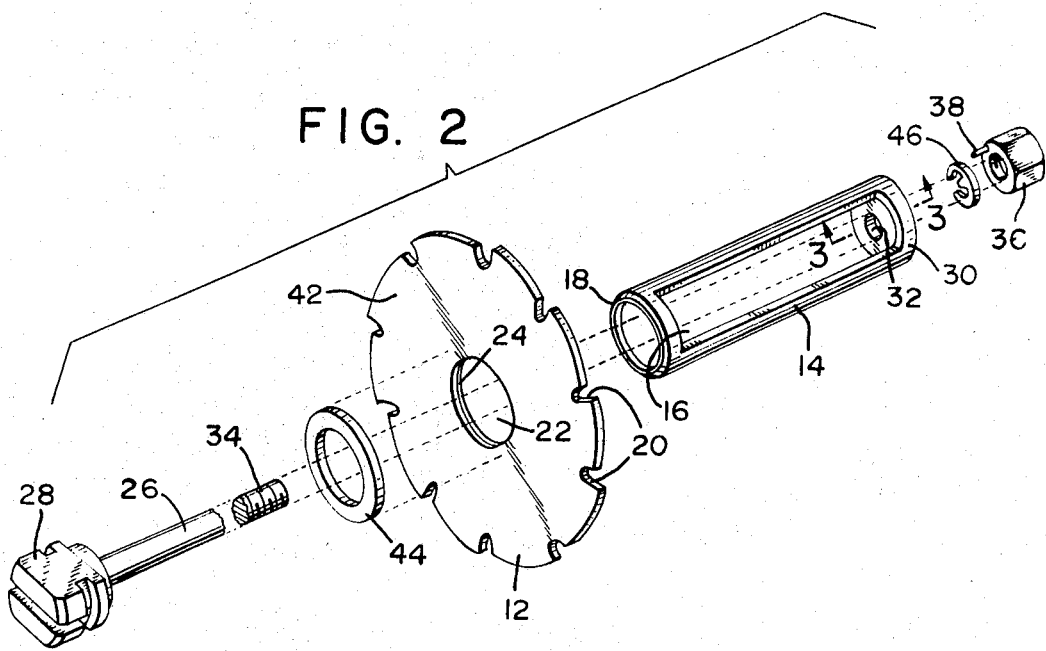
FIG. 2 is an exploded view of the device shown in FIG. 1.
Figure 3:
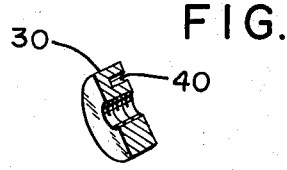
FIG. 3 is a partial sectional view taken along line 3—3 of FIG. 2.

In accordance with a preferred embodiment of this invention, there is shown in the drawings an energy absorbing means 10 for a seat belt retractor. The surrounding seat belt retractor structure has been omitted since it is conventional. The retractor may be of the automatic locking type in which case the belt shaft is locked subsequent to a particular movement of the shaft (such as following partial retraction of the shaft after initial extension). Alternatively, the retractor may be of the inertia locking type in which suitable inertia responsive means (e.g., a pendulum weight) is actuated at an acceleration or deceleration of the vehicle (as in an accident) above a predetermined rate so that the retractor is locked.

Ratchet or locking wheel 12 as shown is attached to a belt shaft 14 and together they form a cone clutch structure as is described below. As is conventional, belt shaft 14 includes a slot 16 which provides a location for securing the seat belting to the belt shaft. Belt shaft 14 contacts ratchet wheel 12 at shaft end portion 18 which is beveled. The belt shaft end portion 18 is tapered downwardly from its main section towards ratchet wheel 12. The ratchet wheel is provided with a plurality of ratchet teeth 20 and a centrally located aperture 22. The wall portion 24 of wheel 12 surrounding aperture 22 is beveled so that its thicker portion is adjacent end portion 18 of belt shaft 14. The beveled belt shaft portion 18 and ratchet wheel portion 24 are forced together into abutting relationship to form a cone clutch structure. A load shaft 26 similar to central shafts used in conventional retractors and having a head portion 28 extends through opening 22 and internally of belt shaft 14. The beveled walls of aperture 22 are tapered downwardly towards heat portion 28 of lead shaft 26 so that their thicker portion is adjacent beveled end 18 of belt shaft 14. End 30 of the belt shaft opposite its end portion 18 is provided with an aperture 32 through which one end portion 34 of load shaft 26 extends. The cone clutch is preloaded through spring 44 and compression is maintained by restraining end portion 34 of shaft 26 from axial movement by means of a snap ring 46 or a pin. End portion 34 is threaded and is fitted with an internally threaded loading nut 36. Loading or lock nut 36 is provided with an extension or projecting portion 38 which extends into a suitable cooperating depression or slot 40 in the end 30 of belt shaft 14. When assembled, loading nut 36 is spaced a predetermined distance from end 30. Loading nut 36, which is keyed to belt shaft 14, is free to rotate with belt shaft 14 but is movable axially with respect thereto along threaded portion 34 of load shaft 26 as will be described below. A compression spring 44, such as a bellville spring or a dished spring, is supported by load shaft 26 and is located between head portion 28 of load shaft 26 and the outer face 42 of ratchet wheel 12 adjacent opening 22. During assembly of the unit, spring 44 biases ratchet wheel 12 against belt shaft 14 to provide a predetermined load on the system. The entire structure described above is fitted between mounting brackets which support the structure.

Ratchet wheel 12 is normally rotatable with belt shaft 14 during protraction and retraction of the seat belting. During such normal rotation (i.e., the "unlocked" position of the retractor), the entire structure comprising ratchet wheel 12, load shaft 26, spring 44, belt shaft 14 and loading nut 36 rotate together as one unit. When locking means are actuated to prevent further rotation of ratchet wheel 20 in the protracting direction (such as by a pawl engaging one of the ratchet teeth 20), which may occur, for example, after partial retraction of the seat belting following initial extension thereof in an automatic locking retractor, the entire system described above is prevented from rotating in the protracting direction. However, upon a predetermined degree of loading on the belting (and hence on belt shaft 14) due to the force of the seat belt wearer pressing against the belting (such as occurs in an accident), belt shaft 14 and loading nut 36 rotate or slip in the protracting direction with respect to ratchet wheel 12. Ratchet wheel 12 is restrained from rotating at the locked condition of the retractor due to the restraint of the locking means on the ratchet wheel 12; load shaft 26 likewise is restrained from moving due to its contact with the locked wheel.

Rotation of belt shaft 14 in this manner allows a limited, predetermined amount of belting to be paid out. It can be seen that a portion of the kinetic energy imparted to the belting by a moving occupant is absorbed by rotation of the belt shaft. As belt shaft 14 rotates in this fashion with loading nut 36 rotating therewith due to their connected relationship, loading nut 36 moves axially along threaded portion 34 of load shaft 26 in a direction towards end 30 of belt shaft 14. Axial movement of the nut continues until the nut 36 comes into contact or bottoms out against end 30 to a position shown in phantom lines in FIG. 1. When this condition is reached, further rotation of belt shaft 14 causes loading nut 36 to axially compress belt shaft 14, thereby increasing the load on the cone clutch and requiring an increased torque to further rotate belt shaft 14. The torque required to turn belt shaft 14 becomes increasingly greater as belt shaft 14 rotates and undergoes increased restraint by loading nut 36 bearing against the shaft end 30. Although the belt shaft can still rotate, it becomes increasingly more difficult to do so. At the same time, the energy imparted to the belting by the force of the removing occupant becomes increasingly absorbed in the retractor structure in the form of energy transmitted to the belt shaft to overcome the ever increasing torque required to turn the shaft. In this manner, large forces on the belting resulting, for example, from an accident, may be absorbed by the retractor such that there is little or no rebounding and thus the likelihood of injury to the wearer of the seat belt is minimized.

By selecting a compression spring of known compression and load factors, the load at which the belt shaft is allowed to slip with respect to the ratchet wheel may be predetermined. This load may be selected bearing in mind the type of vehicle in which the retractor is installed, the materials of which the energy absorbing structure are made, etc. Furthermore, the amount of belt shaft rotation at the initial load can be preset by selecting the distance between loading nut 36 and end 30 of belt shaft 14. That is, the belt shaft may be allowed to rotate a greater number of rotations (and thus pay more belting out) before the torque required to turn the shaft increases if loading nut 36 is spaced a greater distance from end 30; this is because the nut has a greater distance to travel before it comes into jamming contact with end 30. Conversely, the nut could be placed closer to the end of the belt shaft so that the shaft is allowed to only slightly rotate before the load increases. Selection of the spacing distance between these two parts may be based upon a number of factors, including the type of vehicle, the amount of initial belting payout permissible, etc.

As is apparent from the above description, the herein disclosed device is capable of absorbing energy at approximately a constant rate for a limited, predetermined amount of payout of the belting and is also capable of absorbing energy at a higher rate for further extension of the belting.

In certain instances, it may be desirable to allow the belt shaft to rotate and pay out belting at a constant predetermined degree of rotation. That is, the belt shaft is allowed to rotate with respect to the locked ratchet wheel to a degree limited only by the amount of belting on the belt shaft and not by the necessity of an increased load applied to the system after a predetermined amount of rotation. In such an embodiment, jamming nut 36 is eliminated from the structure shown in the drawings and, as is apparent, end 30 of belt shaft 14 need not be provided with a slot 40.

It is to be understood that variations and modifications of the present invention may be made without departing from the scope of the invention. For example, an additional ratchet wheel may be provided at the opposite end of the load shaft if an additional locking surface is desired.

It is also to be understood that the scope of the invention is not to be interpreted as limited to the specific embodiment disclosed herein, but only in accordance with the appended claims when read in light of the foregoing disclosure.

I claim:

1. An energy absorbing seat belt retractor comprising a lockable locking wheel having an internal aperture,
    an outer shaft having one end inserted in said aperture and an end opposite therefrom, said one end being pressed against said locking wheel, said outer shaft adapted to receive seat belting,
    spring means urging said locking wheel and outer shaft into abutting relationship,
    a load shaft inserted in said aperture and extending internally through said outer shaft, said load shaft having a head portion adjacent said locking wheel and one end remote from said head portion,
    restraining means restraining said load shaft from axial movement with respect to said locking wheel,
    said outer shaft being rotatable with respect to said locking wheel, when said locking wheel is locked, upon the application of a predetermined force to said belting,
    retaining means in the opposite end of said outer shaft,
    loading means supported by said load shaft and spaced from said opposite end of said outer shaft,
    means connecting said loading means to said retaining means for permitting rotation of said loading means with said outer shaft,
    means for moving said loading means along said load shaft in a direction towards said opposite end of said outer shaft and into abutting relation therewith upon rotation of said outer shaft when said locking wheel is locked, whereby the force required to rotate said outer shaft when said wheel is locked is greater after said loading means has moved into abutting relation with said opposite end of said outer shaft.

2. The retractor as claimed in claim 1 wherein said internal aperture of said locking wheel includes beveled walls and said one end of said outer shaft is beveled in the direction of the bevel of said walls of said aperture.

3. The retractor as claimed in claim 2 wherein said beveled walls of said locking wheel aperture and said beveled end of said outer shaft form a cone clutch structure.

4. The retractor as claimed in claim 3 wherein said loading means comprises a loading nut.

5. The retractor as claimed in claim 4 wherein said load shaft is threaded at its portion which supports said loading nut.

6. The retractor as claimed in claim 3 wherein said retaining means comprises a slot formed in said opposite end of said outer shaft and wherein said loading means is connected to said retaining means by a projecting portion on said loading means which projects into said slot.

7. The retractor as claimed in claim 3 wherein said outer shaft comprises a belt shaft having a slot therein for attachment of said seat belting thereto.

8. The retractor as claimed in claim 3 wherein said spring means is biased between said heat portion of said load shaft and said locking wheel.

9. The retractor as claimed in claim 8 wherein said locking wheel comprises a ratchet wheel having a plurality of ratchet teeth.

10. The retractor as claimed in claim 8 wherein the beveled walls of the aperture in said locking wheel are tapered inwardly towards said head portion of the load shaft.

* * * * *